US006796469B2

(12) United States Patent
Lofaro

(10) Patent No.: US 6,796,469 B2
(45) Date of Patent: Sep. 28, 2004

(54) CARRIER DEVICE FOR TRANSPORTING OBJECTS IN VEHICLES

(76) Inventor: Lisa Lofaro, 123 Coral Bay Dr., League City, TX (US) 77573

(*) Notice: Subject to any disclaimer, the term of this patent is extended or adjusted under 35 U.S.C. 154(b) by 0 days.

(21) Appl. No.: 09/864,924

(22) Filed: May 24, 2001

(65) Prior Publication Data

US 2003/0160076 A1 Aug. 28, 2003

(51) Int. Cl.[7] .................................................. B80R 7/04
(52) U.S. Cl. ...................... 224/275; 224/572; 224/906; 224/926; 248/346.06; 248/346.3; 296/37.15; 296/37.5
(58) Field of Search ............................... 224/275, 572, 224/906, 925, 926, 929; 248/346.03, 346.06, 346.3, 346.4; 206/477, 483, 784, 560; 220/737; 296/37.15, 37.5

(56) References Cited

U.S. PATENT DOCUMENTS

| | | | | | |
|---|---|---|---|---|---|
| 1,176,932 | A | * | 3/1916 | Smith ........................... | 206/763 |
| 2,501,675 | A | * | 3/1950 | Grunewald ............ | 248/346.03 |
| 2,633,180 | A | * | 3/1953 | Reed ........................... | 224/275 |
| 2,695,712 | A | * | 11/1954 | Kolander .................... | 224/926 |
| 3,031,162 | A | * | 4/1962 | Whorton ..................... | 224/906 |
| 4,106,829 | A | * | 8/1978 | Dolle et al. .................. | 224/275 |
| 4,832,241 | A | * | 5/1989 | Radcliffe ..................... | 224/275 |
| 5,397,160 | A | * | 3/1995 | Landry ........................ | 224/929 |
| 5,542,589 | A | * | 8/1996 | McKee ........................ | 224/275 |
| 5,551,616 | A | * | 9/1996 | Stitt et al. ................... | 224/926 |
| 6,105,839 | A | * | 8/2000 | Bell ............................. | 224/572 |
| 6,422,440 | B1 | * | 7/2002 | Stone .......................... | 224/275 |

FOREIGN PATENT DOCUMENTS

WO        WO-90/08671 A1 * 8/1990  .............. 296/37.15

* cited by examiner

Primary Examiner—Gary E. Elkins
(74) Attorney, Agent, or Firm—Ward & Olivo

(57) ABSTRACT

Disclosed is a carrier device for the simple and secure transportation of objects, in particular flower containers, in a vehicle. As disclosed, the carrier device comprises a plurality of panels which when folded in a specific manner, form a device for securing an object. In addition, the device comprises notches for securing itself using a conventional seatbelt of a vehicle. Consequently, the device prevents the object from moving by holding the top of the object and surrounding the sides of the object. The device itself is then held stationary by placing a conventional seatbelt around the device, positioning the seatbelt in notches located in predetermined location on the device. The design of the carrier device allows for the object to be some distance from the back of the seat and, as a result, prevent damage to the object.

40 Claims, 14 Drawing Sheets

CARRIER DEVICE FOR TRANSPORTING OBJECTS IN VEHICLES

TECHNICAL FIELD OF THE INVENTION

This invention relates generally to carrier devices. More specifically, this invention relates to a device for safely and securely transporting objects such as flowers in a vehicle. For example, the device according to the invention can secure an object, such as an arrangement of flowers in a vase, within the device, and then be secured on the seat of an automobile using the vehicle's standard seatbelt. In addition, the present invention may secure one or more objects of varying sizes and shapes safely on the seat of a vehicle.

BACKGROUND OF THE PRESENT INVENTION

Carrier devices for vehicles are not new. However, the need for a simple, stable device for transporting objects in vehicles has long been apparent. Carrier devices are generally designed to hold objects on flat, stationary surfaces. However, objects that are transported on uneven and/or moving surfaces, such as the seat of a moving vehicle have a higher probability of shifting, tipping and breaking, thereby causing damage to the interior of the vehicle or the objects themselves.

Individuals who opt to transport objects in a vehicle wish to arrive at their destination safely, without damaging their vehicle, its contents, or any articles they may be transporting. Drivers are often distracted by poorly secured objects moving around within their vehicle, and sometimes even attempt to stabilize such objects by placing them on the floor or on the vehicle seat. This solution is palpably inadequate, as objects still tend to tip, shift, slide or fall while the vehicle is in motion, which can potentially cause damage to the object, the automobile and the driver. Further, the size and shape of some objects do not permit a driver to safely place them on the floor or vehicle seat. One solution is to use the vehicle's standard seatbelt to secure an object. An example of this is a conventional child safety seat, which is specifically designed to be firmly secured in position using the vehicle's seatbelt. However, this does not always work, as a seatbelt is not designed to fit properly around most objects. Further, the shape of the seat or the tension of the seatbelt itself may cause substantial damage to a particular object. Many devices for storing and/or transporting objects in a vehicle are known. Some of these are briefly discussed below.

U.S. Pat. No. 5,829,655 ("Salopek") describes a device for storing objects, which is mounted behind the front seats of an extended cab truck. This device is shown in FIG. 1. The device comprises of a container 8 divided into compartments by panels 2, 4 and 6. One disadvantage with Salopek is that the device is only compatible with an extended cab truck because it is specifically designed to fit over a folded down jump seat. Another disadvantage with such a device is that it must be assembled and installed. Due to its size, a considerable amount of time and effort is required to first assemble then install this device.

Yet another disadvantage with Salopek is that the device does not secure objects stored within its compartments. Thus, objects are free to shift around, tip over and even fall out of the compartments, causing damage to the object and/or the vehicle. Finally, the Salopek device is specifically designed to be mounted in the rear of a vehicle making it difficult to put objects into the device, and virtually impossible for the driver to easily monitor the status of the object while driving.

U.S. Pat. No. 6,105,839 ("Bell") discloses a seat back carrier 9, specifically designed to hold oxygen tanks, as depicted in FIG. 2A. Bell provides a personal oxygen system carrier comprising first frame 11 which is constructed from horizontal support members frames 12 and 14 and vertical support members 10 and 16, second frame 17 constructed from horizontal support members frames 19, 20 and 24, and vertical support members 18 and 22. Upper and lower struts 26 having first end-28 and second end 40 both rotatably connect to first frame 11 and second frame 17, respectively. Also, as depicted in FIG. 2B, oxygen tank 46 is secured in carrier 9 by load retention straps 48 and 50, while carrier 9 hangs from headrest 52 by "s" hooks 56 and is secured to seat back 44 by flexible support straps 42 and 54.

One disadvantage of the design disclosed in Bell is that load retention strap 50 rests over the center of the object being carried. Objects more fragile than oxygen tanks are likely to be damaged during transportation because load retention strap 50 is designed to bear a large force on an oxygen tank during transit. Another disadvantage with Bell's design is that, like Salopek's device, it is specifically designed to carry objects immediately behind a seat. This design feature is problematic because it keeps the object out of the immediate sight range of the driver and it limits the transporting of objects to specific shapes, sizes and weights. For example, the carrier will likely jostle smaller, lighter objects, causing some or significant damage thereto. Finally, another disadvantage of the design disclosed by Bell is that the dimensions of the device are such that it is impossible to adequately secure objects of varying sizes and shapes, specifically, thinner, smaller objects. Another disadvantage is that smaller objects can slide through the openings of the closed device onto the floor.

Yet another conventional carrier device is shown in FIGS. 3A and 3B. As depicted, carrier 90, which bears the name Kroger Flowers, is a device for transporting flowers in a vehicle. Referring first to FIG. 3A, shown is a top plan view of the pre-constructed version of carrier device 90. This pre-constructed form comprises a generally rectangular sheet forming side panels 60, 62, 64, 66, base panels 68, 70, 72, 74, side flaps 78 and 82 and semi-circle panels 80 and 84. Diamond-cut openings 86 and 88 are positioned on side panels 60 and 64, which, as shown in FIG. 3B, are designed to secure side flaps in the constructed version of carrier device 90. Turning now to FIG. 3B, depicted is carrier device 90 in its constructed form. To construct the device, side panels 60, 62, 64 and 66 must be folded into a square and then secured by folding and gluing bottom panels 68, 70, 72 and 74 on top of one another and then gluing tab 76 to the inside of side panel 66. Once constructed, Kroger has a circular perforated opening on its top formed by semi-circle panels 80 and 84 through which flowers or vases are inserted. The box shape is secured by folding side flaps 78 and 82 into diamond-cut openings 86 and 88 on side panels 60 and 64.

One disadvantage of carrier device 90 is that the shape of the device is not adjustable to securely carry flower arrangements of different shapes and sizes. Though carrier 90 may be useful for certain specific flower arrangements, the standard size will not accommodate a wide variety of flower arrangements. One would have to construct carrier device 90 in alternate sizes to accommodate for different flower arrangements. Another disadvantage is that carrier device 90 cannot adequately secure larger floral arrangements due to their top-heavy nature. Although carrier 90 may provide some support at the sides of the flower arrangement and may provide a flat surface on which a flower arrangement can stand, movement and bumps associated with a moving vehicle will most likely cause the floral arrangement to sway, tip and ultimately fall over. Yet another disadvantage of carrier device 90 is that the bumps and turns associated with vehicular movement will induce side flaps 78 and 82 to pop out of diamond-cut openings 86 and 88, causing the device to collapse. Yet another disadvantage is that carrier device 90 does not have any means to adequately secure it within a vehicle. Although carrier device 90 may provide a flat surface upon which flowers can stand, the device itself is not secure within the vehicle while the vehicle is moving.

Still another disadvantage with carrier device 90 is that if it is placed on the seat of a vehicle, it would likely slide around or even fall over. Also, carrier device 90, even though it is specifically designed to carry flowers, does not provide sufficient space between the object being secured (i.e., the floral arrangement) and the seat back of the vehicle, thus likely to cause the flower arrangement to lean against the seat back for support, thereby causing damage to the flowers. Finally, another disadvantage is that the device of Kroger cannot be adequately secured by a seatbelt. The device has smooth sides and edges which would cause the seatbelt to slide off of it. The seatbelt can also slide up into a flower arrangement, causing damage to the flowers.

For the foregoing reasons, a need for a simple and portable device for transporting objects in a vehicle exists. It is also important for the device to be easily accessible and be within the immediate eye sight of the driver. In particular, a device that can be secured with a seatbelt without causing damage, and one that can be easily constructed to fit and secure objects of varying sizes and shapes. A review of the prior art shows a need for a specific invention designed especially for the transportation of flower containers in vehicles. The need exists for a device to allow the secure transportation of flowers in a vehicle, while keeping them stationary and without causing any damage to the vehicle or the flowers themselves. Also there is a need for a device which supports objects by something other than the seat back. Accordingly, the need exists for a device that will not cause damage to the object being transported, that does not hang on the back of a vehicle seat, that allows a driver to monitor the object without difficulty and that will adequately secure objects in a vehicle while in transit.

SUMMARY OF THE INVENTION

The present invention is for a carrier device for safely and securely transporting objects in a vehicle. For example, the device according to the invention can secure an object such as an arrangement of flowers in a vase within the device. The device may then be secured on the seat of an automobile using the vehicle's conventional seatbelt. In addition, the present invention may hold one or more objects of varying sizes and shapes safely and securely on the seat of a vehicle.

It is an object of the present invention to provide a device that securely hold objects upright in a stationary position while being transported in an unstable environment such as the seat of a moving vehicle.

Yet another object of the present invention is to prevent an object from tipping over while being transported in a vehicle. Objects which are not specifically designed for transportation in automobiles inherently lack stability while in a moving vehicle, and therefore will tip when placed in the seat or on the floor of a moving vehicle. The present invention mitigates those problems of an unstable automobile ride by providing a larger and flat bottom surface on which the object may stand.

Yet another object of the present invention is to provide a secure and stationary means to hold a container in a moving vehicle. The present invention is designed to carry various objects including, but not limited to, flower arrangements, vases, cups, canisters and buckets. The object is secured within the present invention at the apex of the device and by the sides of the device. The perforations at the apex of the device secures the object. The object is then secured by the sides of the device, which cover the object. The adjustable sides limit the space around the object, thereby immobilizing it. By holding an object near its base and at the apex, the device prevents the object from rolling around and/or tipping over while being transported. Additionally, the present invention eliminates the extra step of constructing the device in various sizes, since the present invention is adjustable to hold objects of various widths and heights. The ability of the present invention to be adjusted allows the device to safely and securely carry objects of varying shapes and sizes. The device is designed to allow the driver to monitor the status of the object by securing it in the front seat or another seat of the vehicle, rather than placing the object in the trunk, on the floor or anywhere else in the vehicle.

Yet another object of the present invention is to prevent damage to the object. The apex of the device is built such that the object will be positioned toward the front of the seat. This design feature creates distance between the seat back and the object, thereby protecting the object from being crushed.

Yet another object of the present invention is to reduce a driver's distraction by the instability of the transported object. A driver transporting an object wants to ensure the object gets to its destination without damage to it or to the vehicle. The present device provides a safe and secure means of transporting the object by first holding the object and second by allowing the device itself to be secured with a seatbelt.

Yet another object of the present invention is that it is designed to fit in all modes of transportation that provide seatbelts, including cars, buses, trains, vans and even airplanes.

Other objects, features, and characteristics of the present invention, as well as the methods of operation and functions of the related elements of the structure, and the combination of parts and economies of manufacture, will become more apparent upon consideration of the following detailed description with reference to the accompanying drawings.

BRIEF DESCRIPTION OF THE DRAWING

A further understanding of the present invention is seen in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference in now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis of the claims herein which define the scope of the present invention. The following presents a detailed description of a preferred embodiment (as well as some alternative embodiments) of the present invention.

Figure 1:
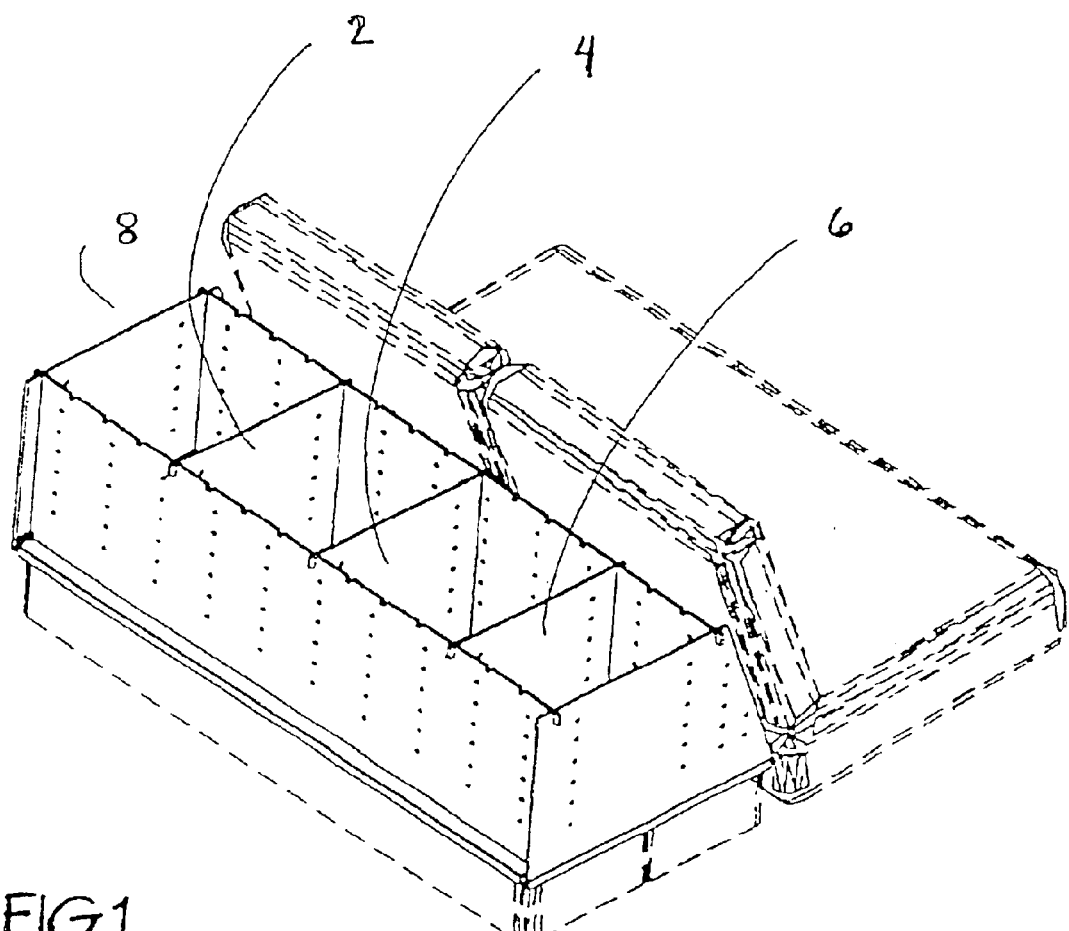
FIG. 1 shows a perspective view of a prior art cargo transportation device according to U.S. Pat. No. 5,829,655.
Figure 2A:
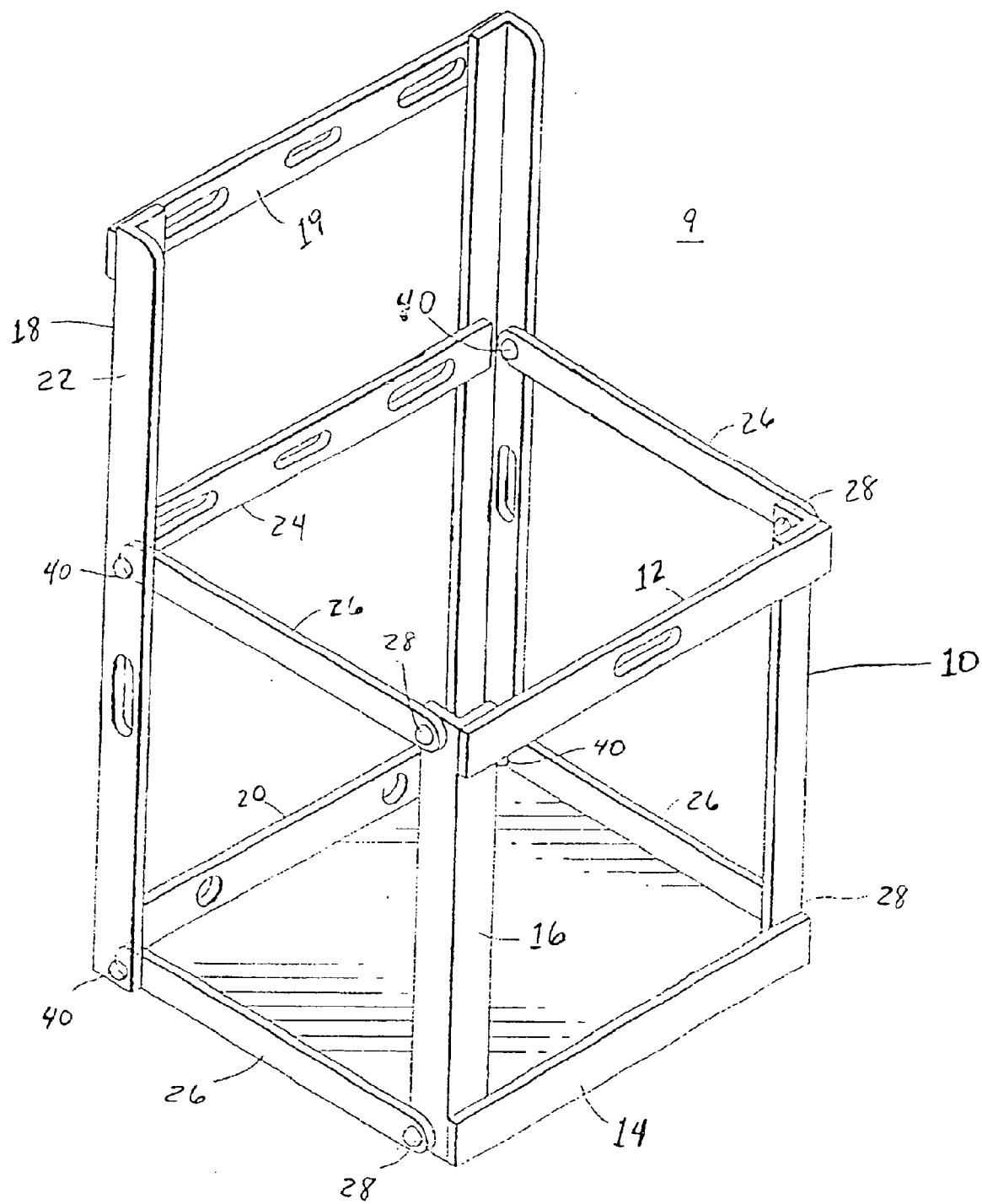
FIG. 2A shows a perspective view of a prior art oxygen transportation device according to U.S. Pat. No. 6,105,839 in the open position.
Figure 2B:
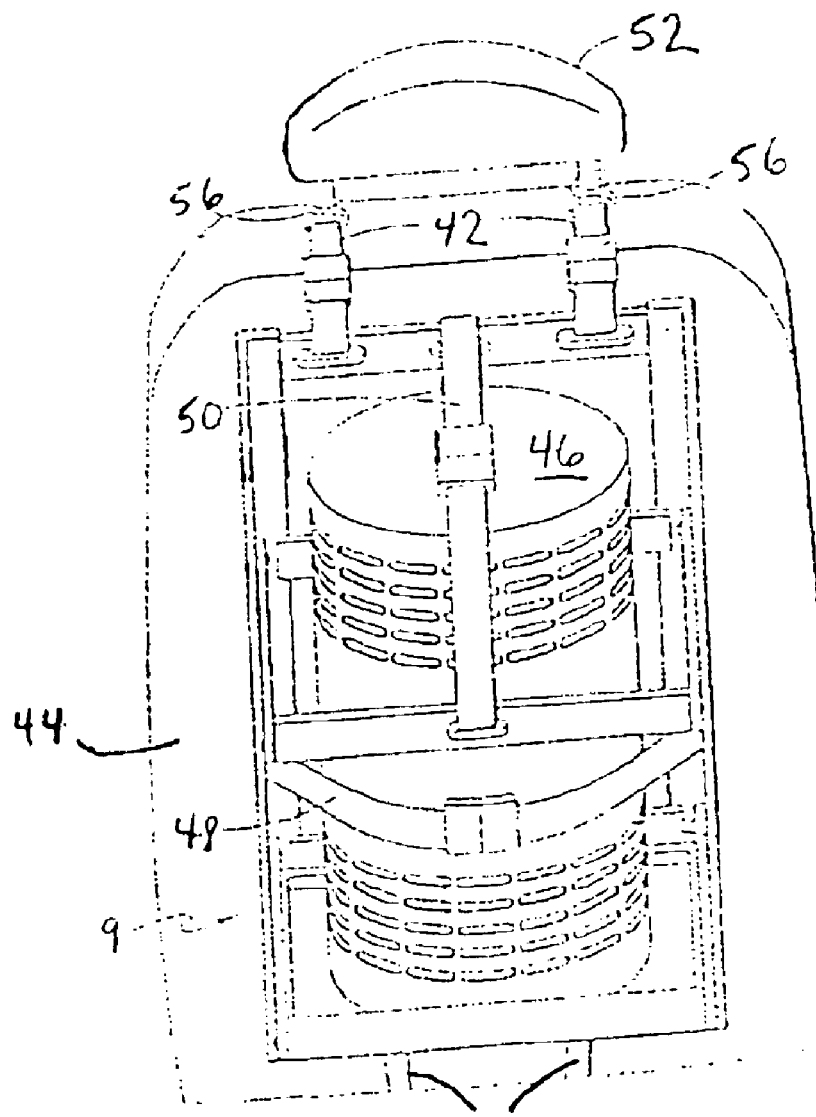
FIG. 2B shows a front view of the carrier of FIG. 2A holding an oxygen tank as it is secured to the back of a seat.
Figure 3A:
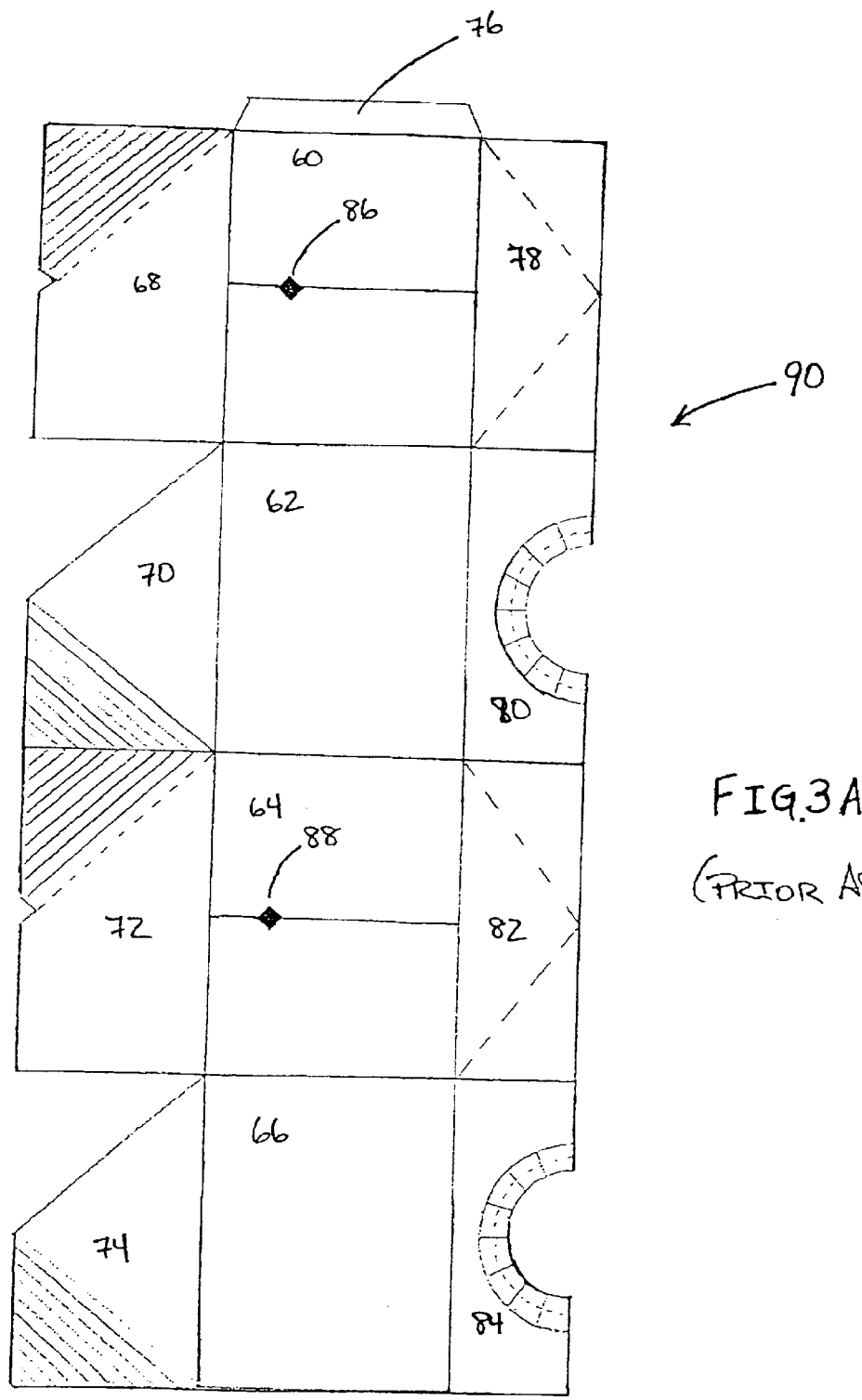
FIG. 3A shows a top view of a conventional device for transporting flowers in vehicles in its pre-constructed position.
Figure 3B:
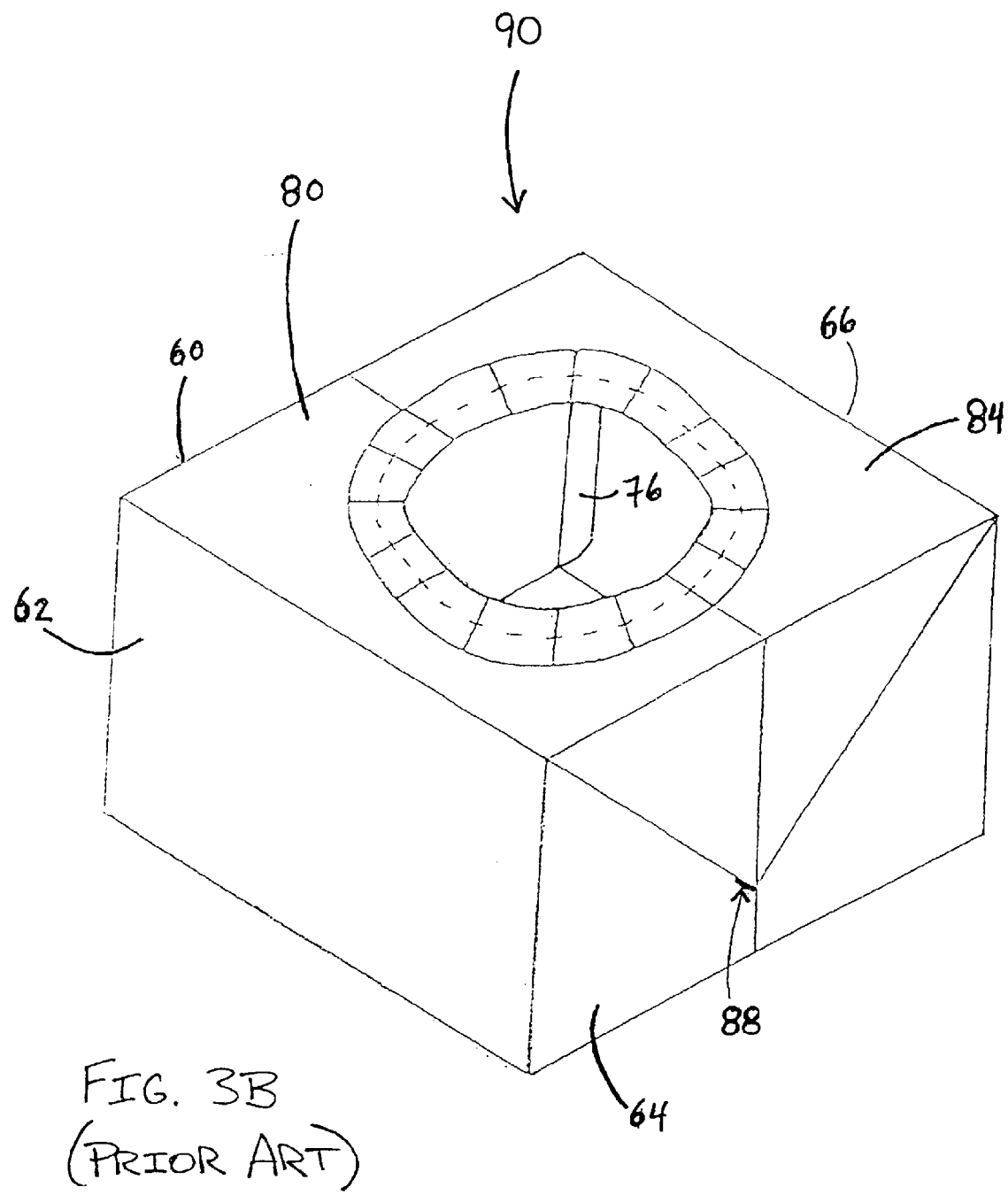
FIG. 3B shows the device of FIG. 3A in its constructed position.
Figure 4:
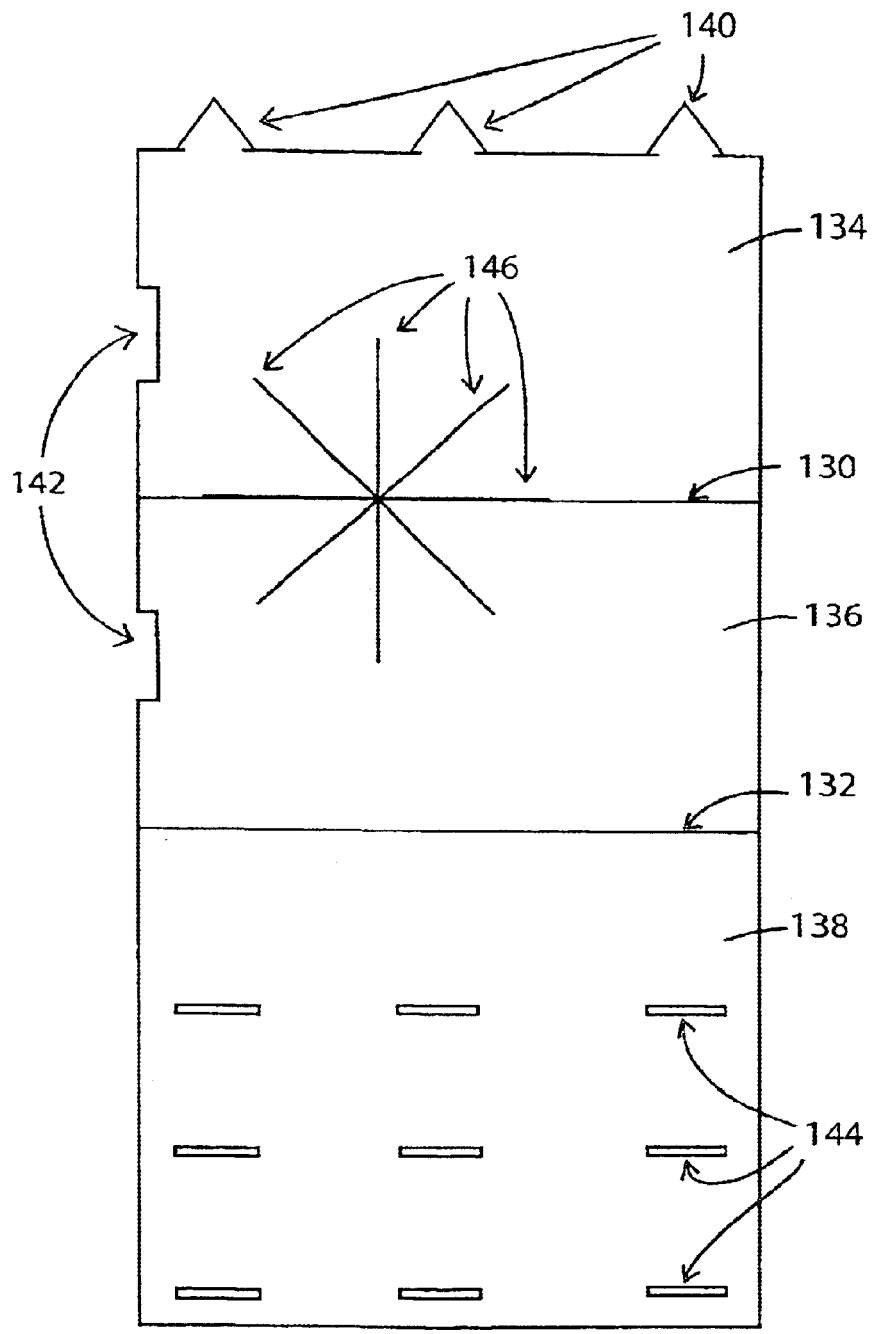
FIG. 4 shows a top plan view of the preferred embodiment of the carrier device according to the present invention in its pre-constructed position.

Referring first to FIG. 4, shown is the preconstructed form of the preferred embodiment of the present invention. As depicted, fold lines 130 and 132 on the rectangular sheet form panels 134, 136 and 138. Panels 134 and 136 each possess one seatbelt notch 142 near perforated lines 146. Tabs 140 are positioned on the unfolded end of panel 134, while slots 144 are cut from the surface of horizontal base panel 138.

Figure 4A:
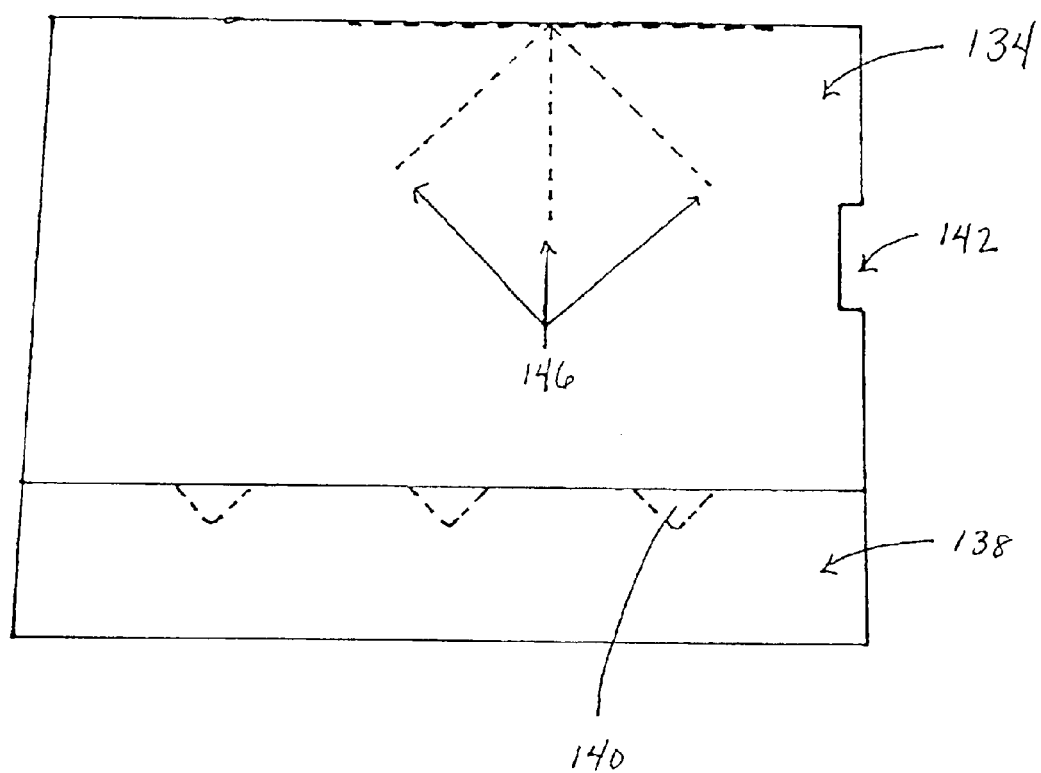
FIG. 4A shows a side view of the carrier device of FIG. 4 in its constructed position.
Figure 5A:
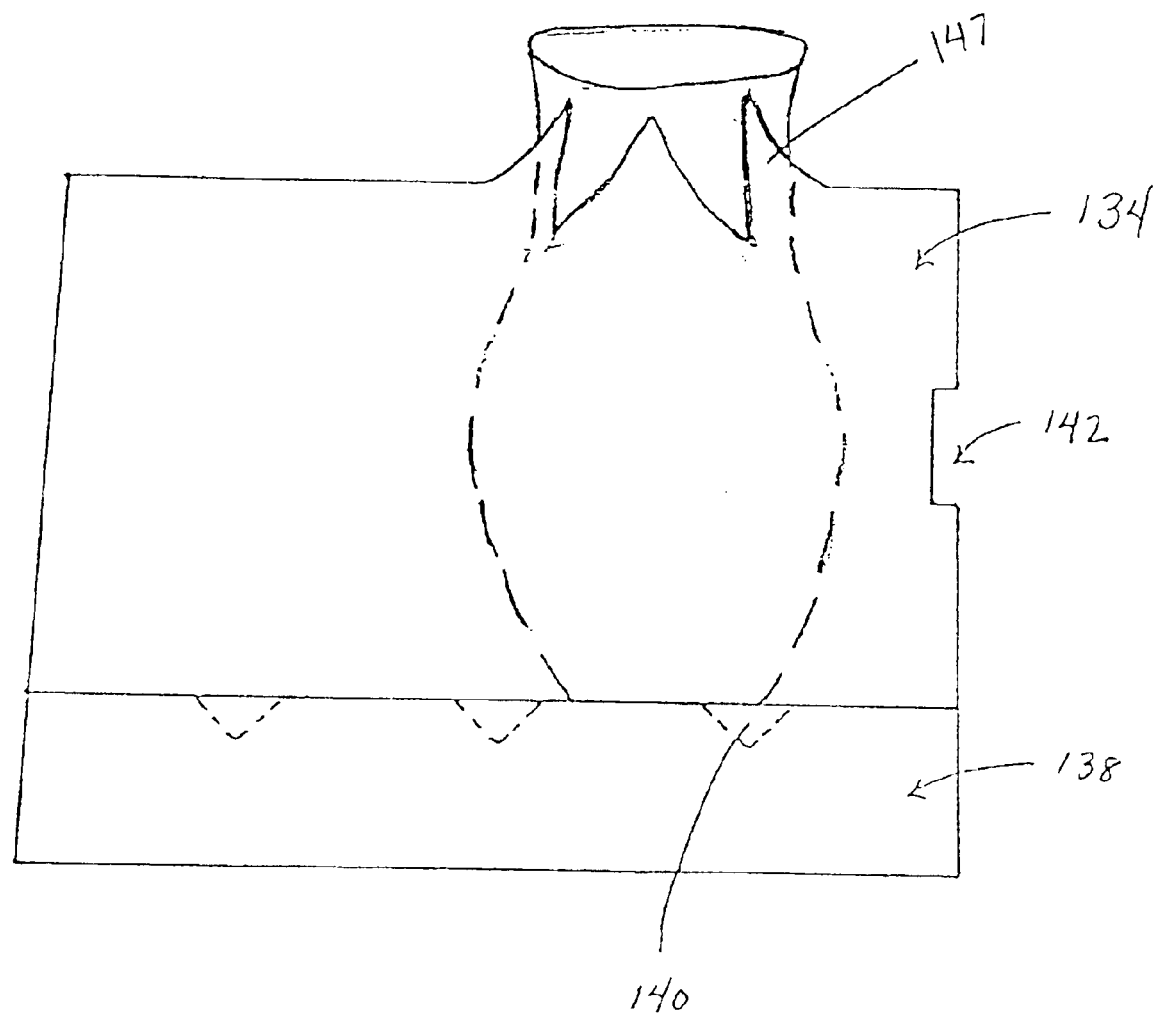
FIG. 5A shows a side view of the carrier device of FIG. 4A having an object, such as a flower vase, positioned therein.

Next, FIG. 4A shows one side of the fully constructed view of the present invention. Objects are inserted through perforated lines 146, which are positioned toward the front of the device away from the seat back to provide ample space between the seat back and the object when the present invention is placed on a vehicle seat. As a result of this design, more delicate objects are protected from damage. For example, referring now to FIG. 5A, shown is the present invention holding a vase. The top of the vase is surrounded by and secured in place by flaps 147 which are formed once perforated lines 146 are pierced. Flaps 147 provide extra support in holding the vase securing the vase at its top end. The vase is positioned off-center in the present invention to protect the vase and its contents from the seat back. Of course, flaps 147 may be pushed outward (as shown in FIG. 5A) or may be pushed inward (not shown) to secure an object. Generally, pushing flaps 147 outward would secure larger objects, while pushing flaps 147 inward would secure smaller objects.

Figure 4B:
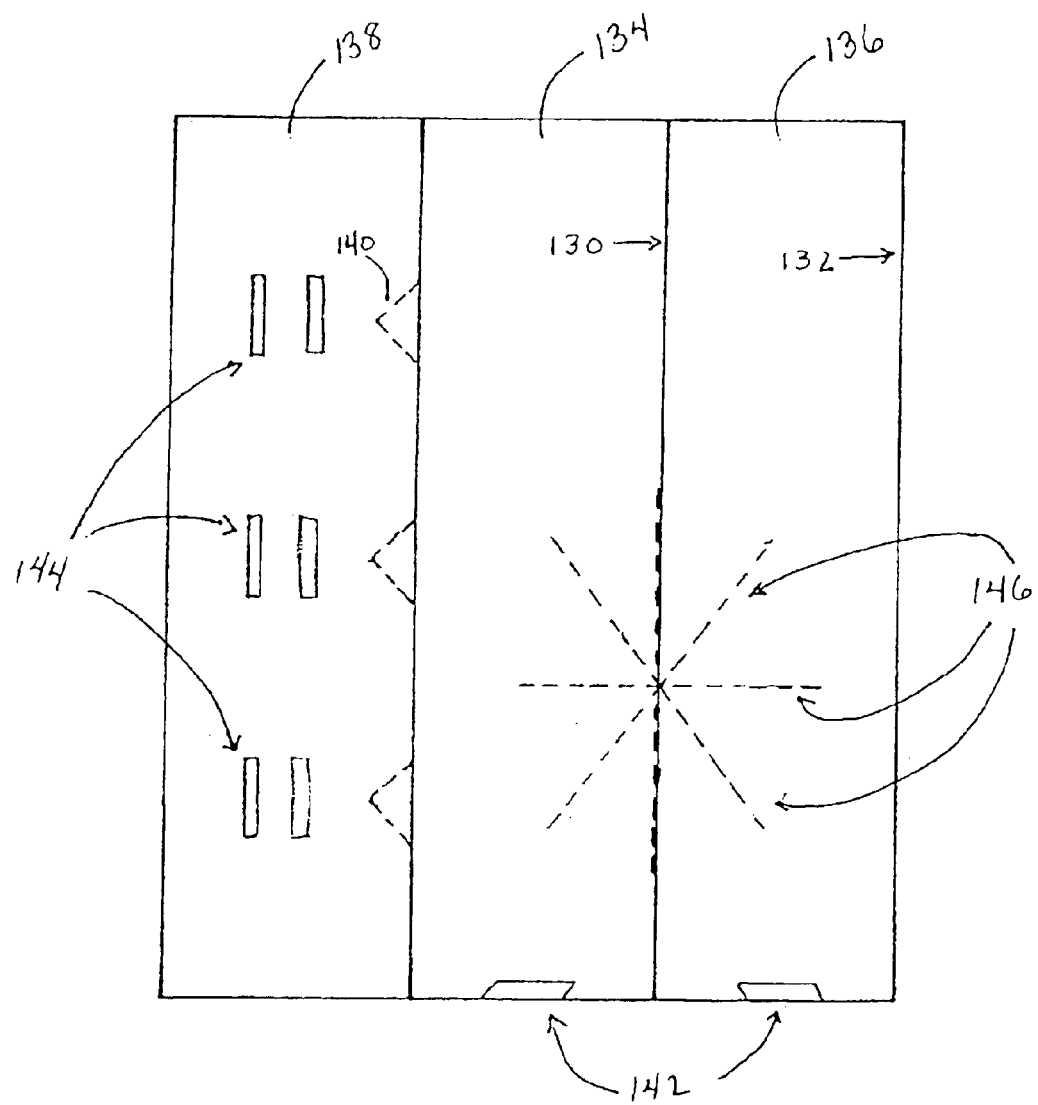
FIG. 4B shows a top plan view of the carrier device of FIG. 4A.

FIG. 4B shows the top view of the preferred embodiment of the present invention. As depicted, the preferred embodiment is folded along fold lines 130, and 132 thereby forming panels 134, 136 and 138. Tabs 140 on vertical panels 134 are inserted into slots 144 on the surface of horizontal base panel 138. As shown in FIG. 4B, slots 144 can be placed at different distances to accommodate for the varying sizes of objects. In alternative embodiments, the position of slots 144 can vary to accommodate objects of different sizes and shapes, such as fish bowls, etc.

Figure 4C:
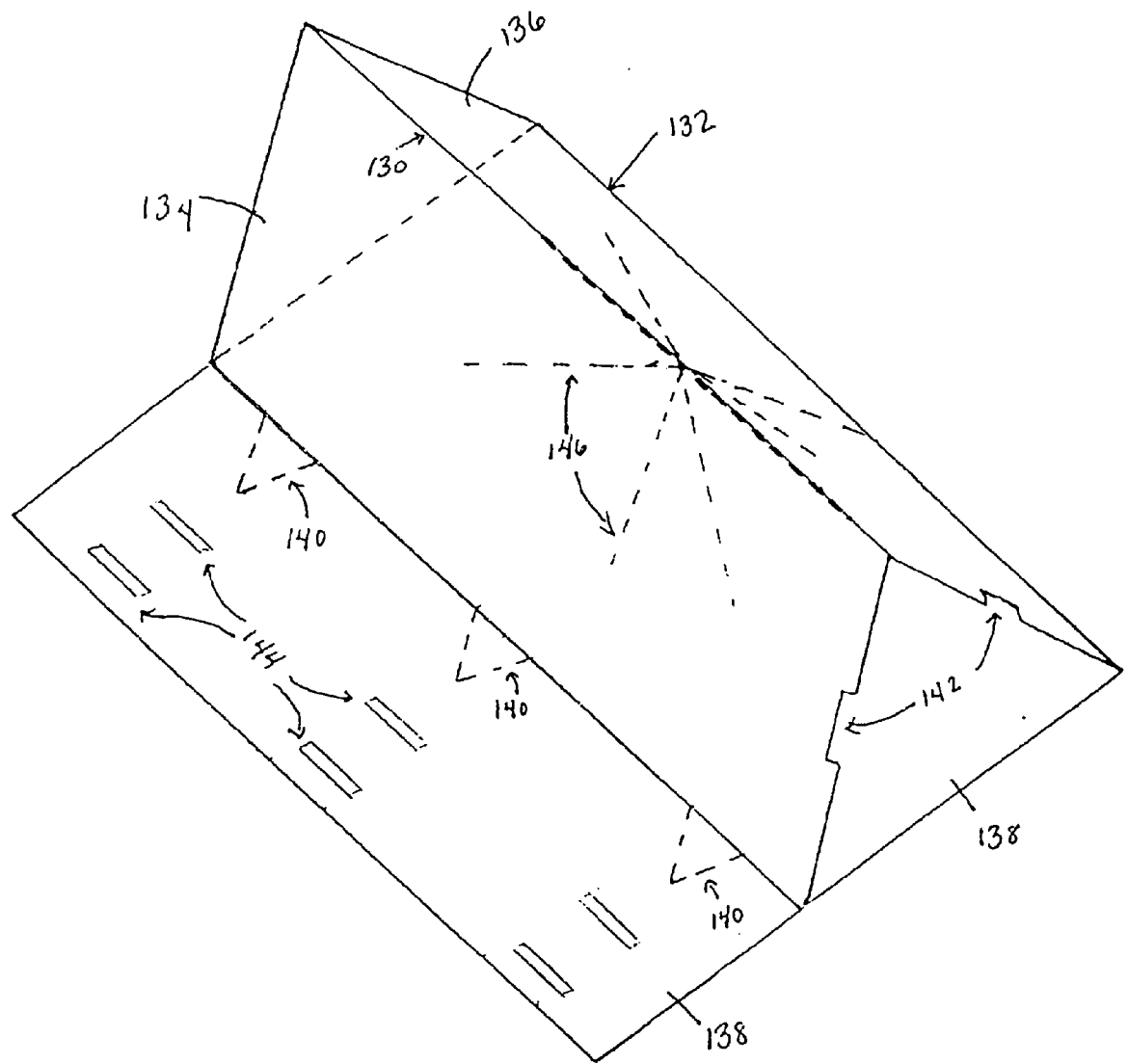
FIG. 4C shows a perspective view of the carrier device of FIG. 4A.

FIG. 4C shows the top perspective of the device. Vertical panels 134 and 136 are positioned above horizontal base panel 138 to form a triangle. Apex 130 of the device is formed by vertical panels 134 and 136 which are folded along fold line 130. In the preferred embodiment, horizontal base panel 138 rests on the seat of the automobile.

Figure 5B:
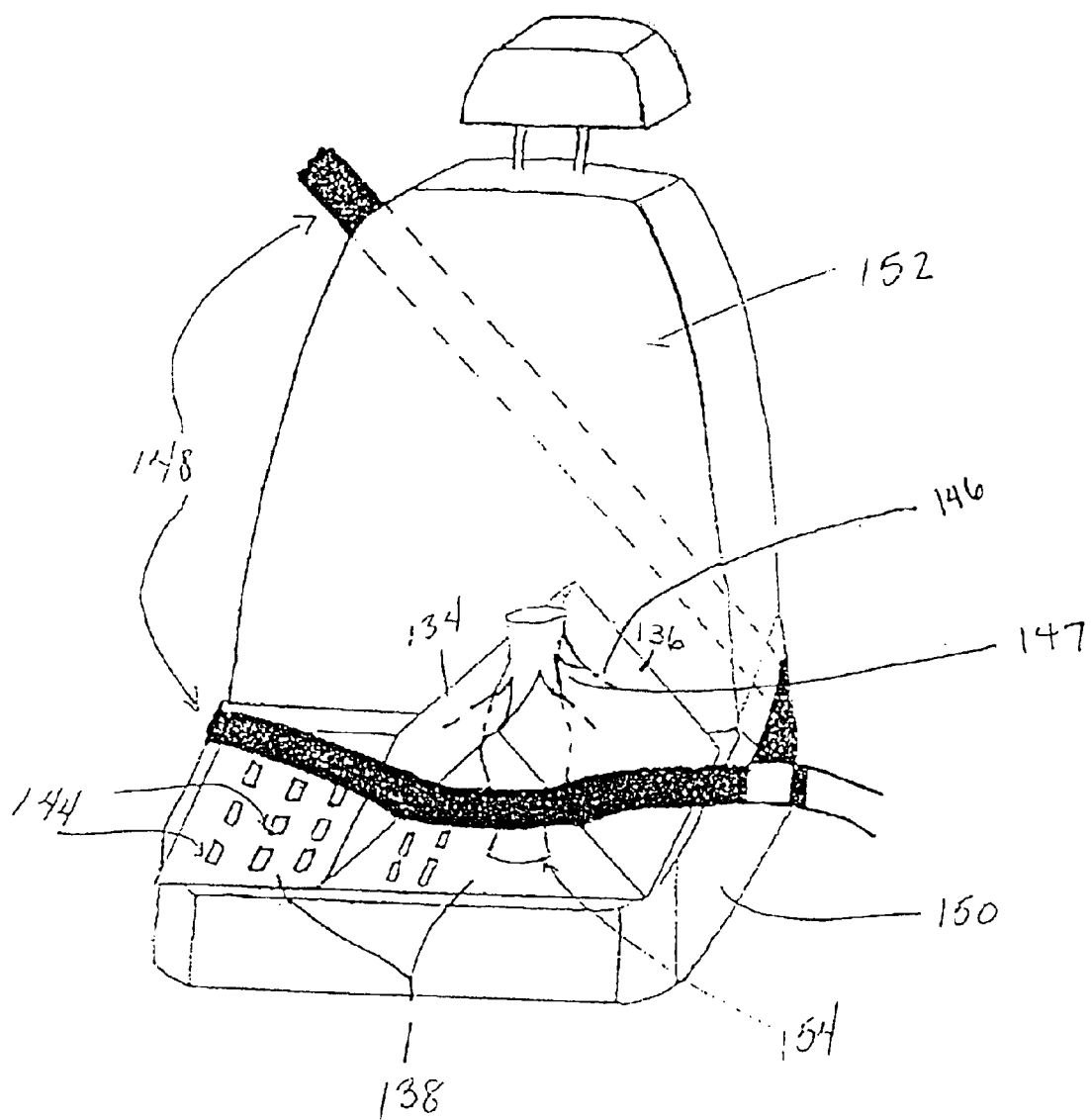
FIG. 5B shows the carrier device of FIG. 5A as positioned in an automobile seat, and secured by a conventional seatbelt.

Referring next to FIG. 5B, shown is a perspective view of the present invention secured in a seat 150 by seatbelt 148. Seatbelt 148 fits securely into seatbelt notches 142 and anchors the present invention into automobile seat 150. Perforated lines 146 are thus positioned farther away from seat back 152 to provide distance between the object and seat back 152.

Figure 6:
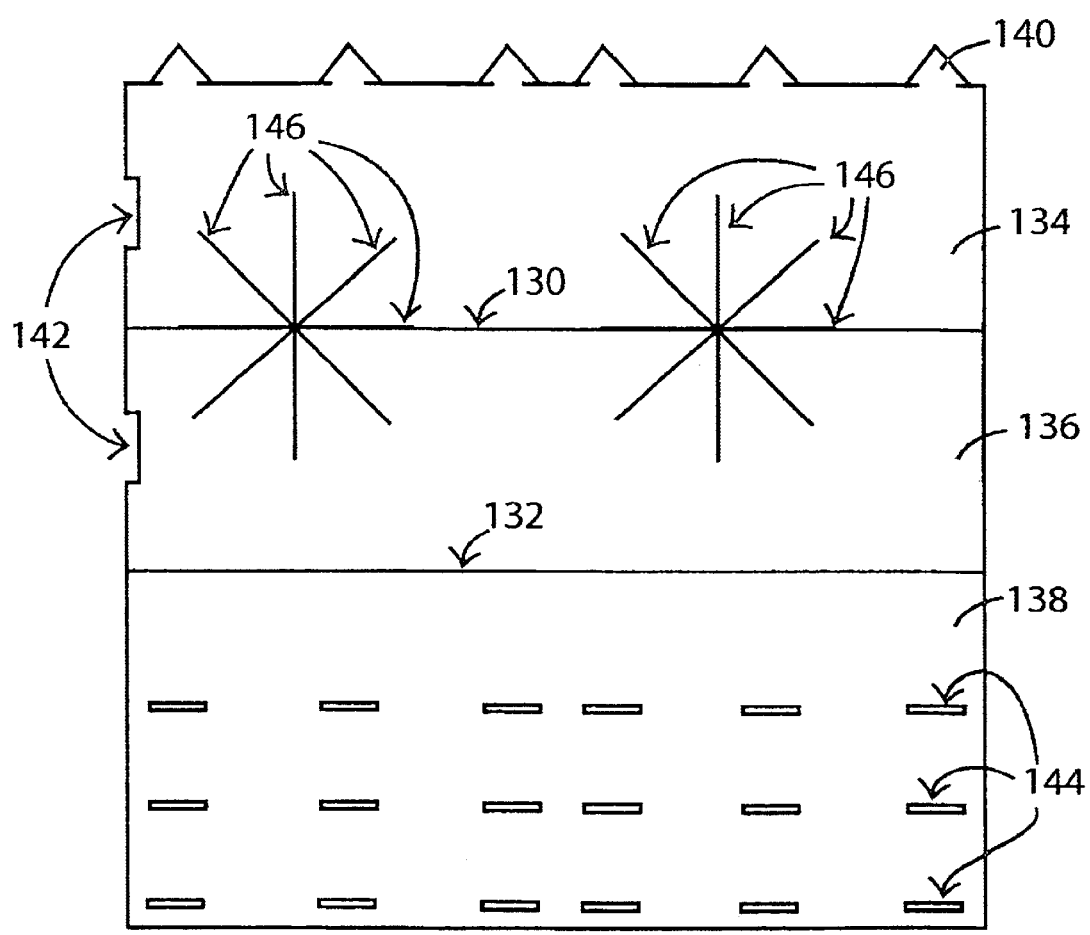
FIG. 6 shows a top plan view of an alternative embodiment of a carrier device according to the present invention in its pre-constructed position.

One alternative embodiment of the present invention is a double carrier device for transporting objects in vehicles (see FIG. 6). This embodiment mitigates the problem of transporting two separate objects at once. Both containers can then be positioned away from the back of the seat and away from each other.

Another alternative embodiment has a no-slip horizontal base panel 138. The base panel can comprise of non-slip material including but not limited to felt, velcro, cloth or rubber. This provides more friction allowing less movement between the horizontal base 138 of the device and the surface it contacts such as the seat of a vehicle 150 (see FIG. 5B). Examples of such surfaces typically consist of fabric, vinyl or leather.

In yet another embodiment, the device has four panels to safely and easily enclose square-like or rectangular objects such as fish tanks, VCRs or video game consoles. The present invention can vary in sizes to accommodate for large or smaller items. In another alternative embodiment the present invention has four panels and extra material along the horizontal base to form an enclosed base in order to transport objects like trays of food or piles of loose paper.

In another alternative embodiment, clips or sticky/tacky material are positioned at perforated lines 146 and flaps 147. The clips or sticky/tacky material attach on object to provide extra security. In yet another embodiment of the present invention, horizontal base panel 138 has sticky/tacky material on its inner surface to secure the bottom of the object. Yet another alternative embodiment may comprise handles (not shown), for example, on panel 138 between slits 144 and fold 132, as a means for carrying the device. The handles are preferably made of the same material as the device, but can be cloth, plastic, wire, string or rope.

Figure 7A:
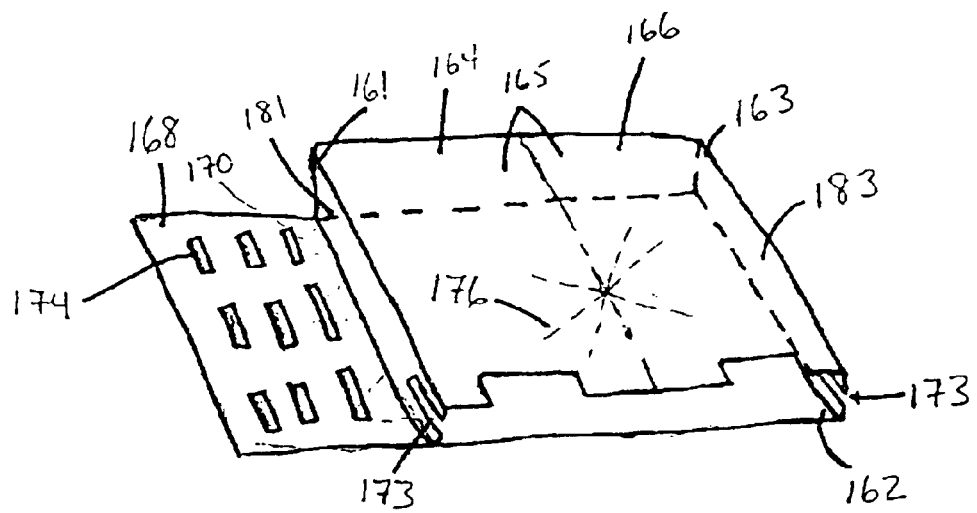
FIG. 7A shows a perspective view of yet another alternative embodiment of a carrier device according to the present invention in its constructed position.

Yet another alternative embodiment of the present invention has a plurality of fold lines on its side panels to allow construction of the invention into a rectangular shape as depicted in FIG. 7A. Fold lines 161 and 163 are located on panels 164 and 166 respectively. Fold line 161 is positioned on panel 164, above tabs 170, and while fold line 163 is positioned on panel 166 above fold line 162. These additional fold lines allow for construction of a rectangular embodiment when four panels, two vertical and two horizontal, are formed by folding along fold lines 161, 162, and 163 and then inserting tabs 170 into slots 174. The rectangular shape of this embodiment is then secured by inserting tabs 170 into slots 174 on horizontal base panel 168. Once constructed, top horizontal panel 165 is formed by panels 164 and 166. Vertical panel 181 is necessarily formed once tabs 170 are inserted into slots 174 and fold line 161 is folded. Finally, vertical panel 183 is formed by folding along fold lines 162 and 163. In another alternative embodiment, seat belt slits 173 are located on vertical panels 181 and 183. In further alternative embodiments seat belt slits may be perforated openings, perforated lines, notches or cut outs. Perforated lines 176 extend radially from a center point located on top of horizontal panel 165. Preferably, perforated lines 176 form a circular pattern and are equally distant from each other. Also preferable is that perforated lines 176 are positioned such that the opening for securing an object is toward the front of the device. Also, slots 173 are positioned such that the lap portion of a conventional seatbelt may be inserted therein to secure the device to the seat.

In another alternative embodiment, perforated lines 176 can be positioned exactly in the middle, in one corner or towards one end of top horizontal panel 165. In other alternative embodiments the plurality of perforated lines 176 ranged in number from two to hundreds. In yet other alternative embodiments, perforated lines 176 may be positioned in such a manner as not to be equally distant from each other. Perforated lines 176 may also form scores or cut outs, and may be square-like, rectangular, ovular or triangular in shape. The non-circular opening would allow objects having square, rectangular ovular or triangular shaped tops to be tightly secured by the opening of the device.

Figure 7B:
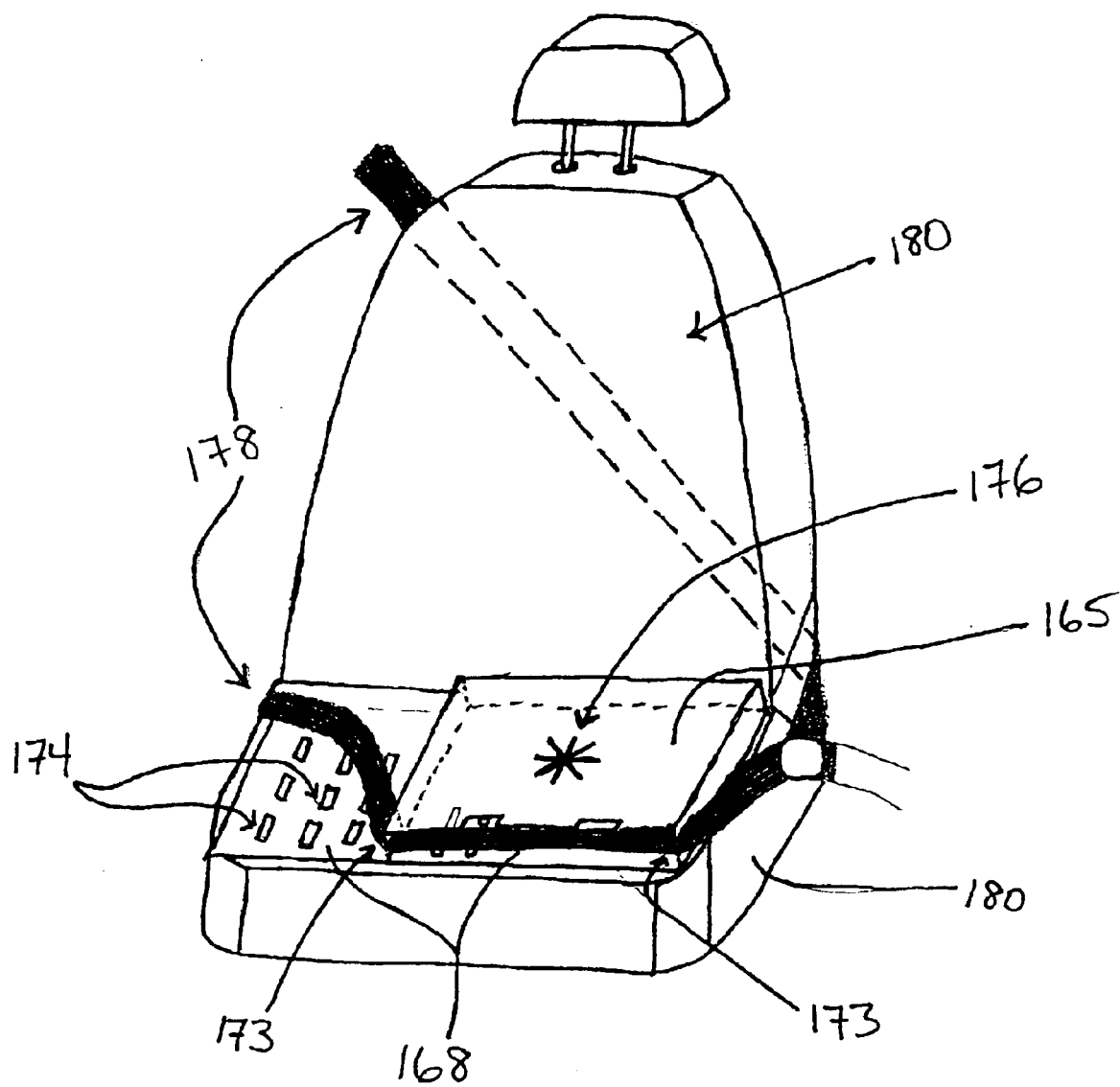
FIG. 7B shows the carrier device of FIG. 7A as positioned in an automobile seat, and secured by a conventional seatbelt.

Referring to FIG. 7B, the device is secured into vehicle seat 150 by positioning seat belt 178 through seat belt slits 173. The square-like or rectangular configuration of the present invention allows for safe and secure transportation of objects such as fish tanks, VCRs, video game consoles and other square or rectangular objects.

The present invention, in accordance with all of the embodiments described herein, is preferably constructed as a single-piece structure and is made of a light cardboard. Alternatively, the present invention may be constructed as a plurality of elements and may be made of plastic, wood, or ceramic.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit of the present invention and that the present invention is capable of being embodiment in other forms without departing from its essential characteristics.

What is claimed is:

1. A device for securely transporting objects in a vehicle, wherein said device comprises:
   a base;
   a plurality of sides;
   at least one opening for holding at least one of said objects; and
   means for securing said device within said vehicle;
   wherein at least one of said sides comprises said means for securing said device;
   wherein each of said plurality of sides is attached to said base such that said sides and said base form a region for positioning said object or objects therein;
   wherein said opening is positioned between said sides; and
   wherein said opening is formed by a plurality of slits on said sides extending from a common point along an edge of at least one of said sides such that said slits are approximately equidistant from each adjacent slit.

2. A device according to claim 1, wherein said plurality of slits on each of said sides comprises three slits.

3. A device according to claim 1, wherein said means for securing said device comprises at least one notch on at least one edge of at least one of said sides.

4. A device according to claim 3, herein said notch is such that it accepts a strap.

5. A device according to claim 1, wherein said device is manufactured as a single structure such that said base and said sides are formed by folding said single structure.

6. A device according to claim 1, wherein said device is constructed from a material selected from the group consisting of cardboard, oaktag, wood, plastic, foam and metal.

7. A device according to claim 1, wherein at least one edge of at least one of said sides comprises at least one connector and said base comprises a plurality of slots for accepting said connector.

8. A device according to claim 7, wherein said slots are positioned such that said region of said device for positioning said object or objects is adjustable.

9. A device according to claim 1, wherein said device comprises more than one opening, wherein each said opening is capable of accepting at least one object.

10. A device according to claim 1, wherein said base is elongated.

11. A device according to claim 1, wherein said base comprises means for attaching said sides to said base such that the height and width of said device is adjustable.

12. A device for securely transporting an object or objects in a moving vehicle, wherein said device comprises:
   a base region having at least one first connecting means;
   a plurality of sides each having at least three edges, wherein each of said sides is attached to said base and wherein each of said sides is attached to another of said sides;
   at least one opening for securing said object or objects within said device; and
   means for securing said device in a stationary position;
   wherein a first of said sides is attached to a second of said sides forming a region for positioning said object or objects therein;
   wherein said opening is positioned at the top of said region; and wherein at least one of said plurality of sides comprises at least one second connecting means such that said at least one of said plurality of sides is attached to said base by attaching said first connecting means to said second connecting means.

13. A device according to claim 12, wherein said first connecting means comprises at least one slot and wherein said second connecting means comprise at least one tab such that said at least one of said plurality of sides is attached to said base by inserting said at least one tab into said at least one slot.

14. A device according to claim 13, wherein said first connecting means comprises a plurality of said slots arranged such that attachment of said at least one of said plurality of sides to said base is adjustable.

15. A device according to claim 12, said opening is positioned approximately at the center of said device.

16. A device according to claim 12, wherein said opening is created by at least two slits positioned at the top of said region.

17. A device according to claim 12, wherein said opening is formed by a plurality of slits on said sides extending from a common point along the top of said region such that said slits are approximately equidistant from each other.

18. A device according to claim 12, wherein said means for securing is at least one notch positioned on an edge of at least one of said sides.

19. A device according to claim 12, wherein said device is manufactured as a single structure such that said base and said sides are formed by folding said single structure.

20. A device according to claim 12, wherein said device is constructed from a material selected from the group consisting of cardboard, oaktag, wood, plastic, foam and metal.

21. A device according to claim 12, wherein said device comprises more than one opening, wherein each said opening is capable of accepting at least one object.

22. A device according to claim 12, wherein said base is elongated.

23. A device according to claim 12, wherein said base comprises means for attaching said sides to said base such that the height and width of said device is adjustable.

24. A device for securely transporting an object or objects in a moving vehicle, wherein said device comprises a generally flat and rectangular element, said element having a plurality of first slits, at least one second slit, at least two predetermined fold lines, at least one notch located on a first edge of said element, and at least one connector located on a second edge of said element, wherein said element is formed into said device by folding said element along said predetermined fold lines and positioning at least one said connector within at least one said second slit, wherein said plurality of first slits extend from a common point along a first of said fold lines such that said plurality of first slits are approximately equidistant from each adjacent slit to form an opening, and wherein said at least one notch is positioned such that said device accepts a fastening means for securing said device.

25. A device according to claim 24, wherein said common point is at the midpoint of one of said fold lines.

26. A device according to claim 24, wherein said common point is not at the midpoint of one of said fold lines.

27. A device according to claim 26, wherein at least one of said fold lines has a plurality of third slits extending from a second common point along said fold line such that said plurality of third slits form a second opening.

28. A device according to claim 24, wherein said first slits include slits which are positioned perpendicular to said first fold line and slits which are positioned at forty-five degree angles with respect to said first fold line.

29. A device according to claim 24, wherein said device is constructed from a material selected from the group consisting of cardboard, oaktag, wood, plastic, foam and metal.

30. A device according to claim 24, wherein said fastening means is selected from the group consisting of a seatbelt, rope, wire, strap and bungee cord.

31. A device according to claim 24, wherein said base is elongated.

32. A device according to claim 24, wherein said base comprises means for attaching said sides to said base such that the height and width of said device is adjustable.

33. A device for transporting objects comprising:

a base;

a plurality of sides attached to said base;

an opening; and a means for securing said device;

wherein said means for securing secures said device in a stationary position; and wherein said opening is formed by a plurality of slits oh at least one of said sides.

34. A device according to claim 33, wherein said means for securing comprises at least one notch on at least one of said sides.

35. A device according to claim 33, wherein said device is manufactured as a single structure such that said base and said sides are formed by folding said single structure.

36. A device according to claim 33, wherein said device is constructed from a material selected from the group consisting of cardboard, oaktag, wood, plastic, foam and metal.

37. A device according to claim 33, said base comprises means for attaching said sides to said base such that the height and width of said device is adjustable.

38. A device according to claim 37, wherein said means for attaching comprises at least one connector and said base comprises a plurality of slots for accepting said connectors.

39. A device according to claim 33, wherein said device comprises more than one opening, wherein each said opening is capable of accepting at least one object.

40. A device according to claim 33, wherein said base is elongated.

* * * * *